July 6, 1965  B. B. JONES  3,192,641
LEVEL CONSTRUCTION
Filed Feb. 11, 1963  2 Sheets-Sheet 1
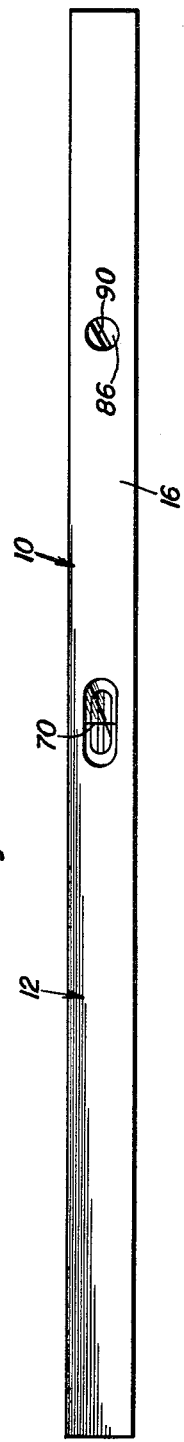
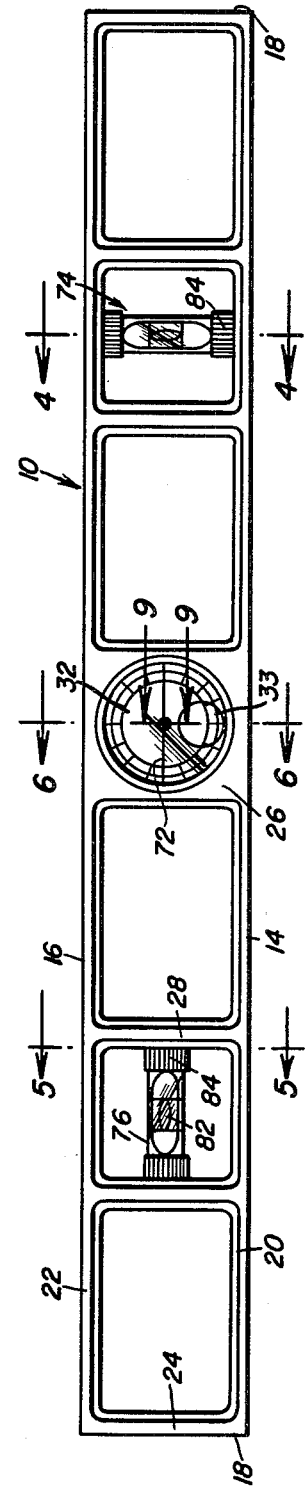
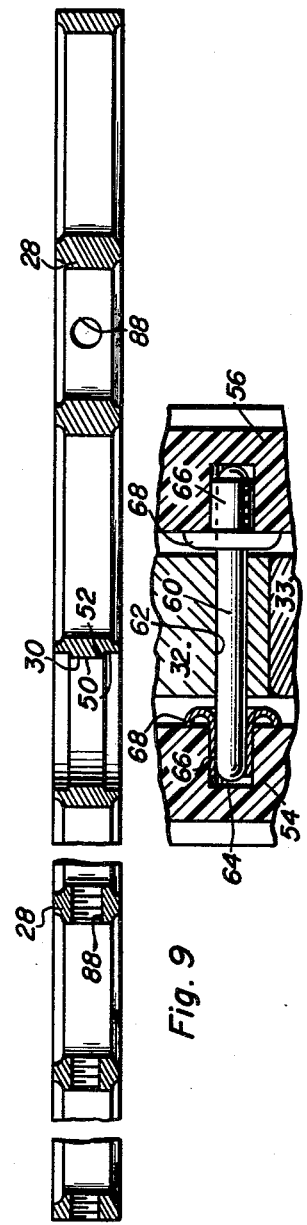
Beecher B. Jones
INVENTOR.

July 6, 1965  B. B. JONES  3,192,641
LEVEL CONSTRUCTION
Filed Feb. 11, 1963   2 Sheets-Sheet 2
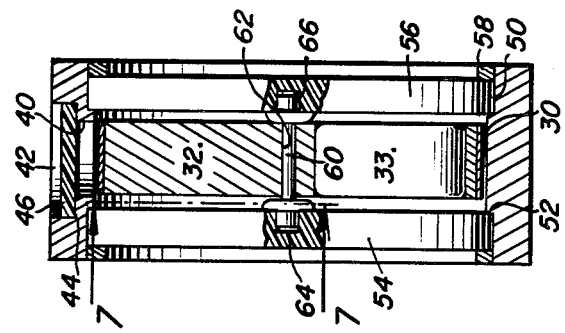
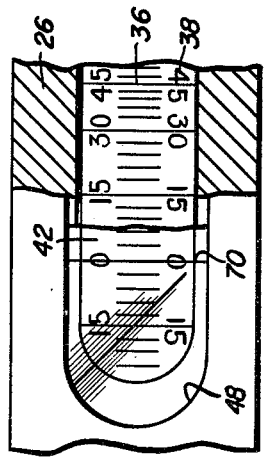
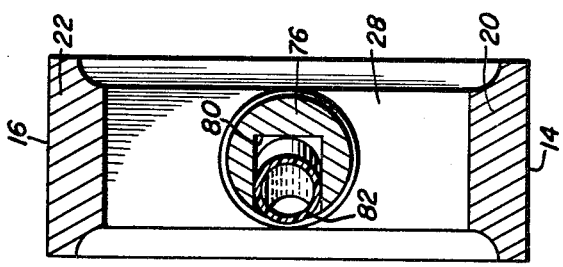
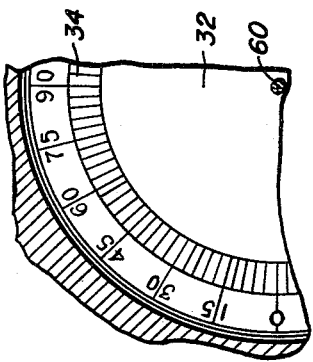
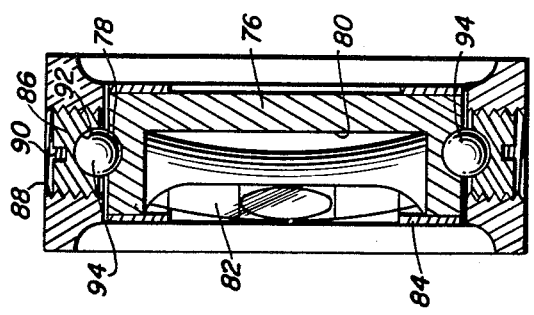
Beecher B. Jones
INVENTOR.

United States Patent Office 3,192,641
Patented July 6, 1965

3,192,641
LEVEL CONSTRUCTION
Beecher B. Jones, 1036 Standish Place N., Owensboro, Ky.
Filed Feb. 11, 1963, Ser. No. 257,485
4 Claims. (Cl. 33—215)

The present invention generally relates to a level and more particularly a novel level construction providing a greater range of application.

One of the objects of the present invention is to provide a level incorporating into the frame spirit level vials which are rotatable manually through a full 360 degrees about their own longitudinal axes.

A collateral object of the present invention is to provide a level incorporating into the frame a gravity operated rotatable graduated angle indicating rotor which may be observed both from the side and top of the frame for easier reading of the graduated angle indicating rotor.

Still another important object of the present invention is to provide a level constructed of a rectangular frame which is structurally strong and rugged enough to withstand rough usage, and still maintain uniformity under various temperature conditions for extended periods of time. The frame is preferably constructed of metallic material with the surfaces thereof accurately orientated in right angular relation to each other.

Yet another important feature of the present invention is to provide a level which is rather simple in construction, easy to use, effective for a greater range of application and generally inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of the level construction of the present invention;

FIGURE 2 is a side elevational view of the construction of the level;

FIGURE 3 is a longitudinal, sectional view of the frame illustrating certain of the components thereof;

FIGURE 4 is a transverse, sectional view on an enlarged scale taken substantially upon a plane passing along section line 4—4 of FIGURE 2 illustrating the construction and mounting of the rotatable spirit level vials;

FIGURE 5 is a transverse, sectional view, on an enlarged scale, taken substantially upon a plane passing along section line 5—5 of FIGURE 2 illustrating further details of the spirit level vial mounting structure;

FIGURE 6 is a transverse, vertical sectional view, on an enlarged scale, taken substantially upon a plane passing along section line 6—6 of FIGURE 2 illustrating the details of construction of the graduated angle indicator structure;

FIGURE 7 is a detailed view taken substantially upon a plane passing along section line 7—7 of FIGURE 6 illustrating the scale on the graduated angle indicating rotor;

FIGURE 8 is a fragmental detailed view illustrating the periphery of the graduated angle indicator rotor and the relationship thereof to the viewing opening formed in the top surface of the level;

FIGURE 9 is a detailed sectional view, on an enlarged scale, taken substantially upon a plane passing along section line 9—9 of FIGURE 2 illustrating the rotatable mounting for the graduated angle indicating rotor.

Referring now specifically to the drawings, the numeral 10 generally designates the level of the present invention which includes an elongated rectangular frame 12 including a bottom surface 14 and a top surface 16 disposed in parallel spaced relation to each other together with end surfaces 18 which are in parallel relation to each other but which are in perpendicular relation to the top and bottom surfaces 14 and 16 respectively. The width of the bottom and top surfaces as well as the end surfaces may vary with it being preferable that the width be continuous throughout the length of the level. The bottom surface 14 is formed on the bottom surface of a bottom member 20 while the top surface 16 is formed on the top surface of a top member 22. The end surfaces 18 are formed on the outer surfaces of end members 24 thus forming a rigid rectangular frame. Disposed at the center of the frame 12 is a central body portion or member 26 which rigidifies the bottom and top members 20 and 22. Disposed between the central body member 26 and each end member 18 is a pair of partition members 28 which are in spaced parallel relation to each other and which are spaced from the end members 24 and the central body member 26 respectively, all as illustrated in FIGURE 2. The entire framework is preferably constructed of one piece of material formed in any suitable manner preferably from the metal or metallic alloy such as aluminum alloy which is not only lightweight in construction but is rugged and durable for long rough usage.

The central body member 26 is provided with a transverse circular opening 30 receiving a cylindrical graduated angle indicating rotor 32 therein. The rotor 32 is provided with a graduated degree scale 34 on each circular side surface thereof and is also provided with a graduated degree scale 36 on the periphery thereof which has designating indicia 38 thereon which is readable from either side of the level. Communicating with the transverse opening 30 is a vertically disposed opening 40 extending through to the top surface 16 of the frame. The upper end 42 of the vertical opening 40 is larger than the bottom portion thus defining a shoulder 44 for receiving a transparent member or lens 46 therein which is in the form of a piece of glass or plastic which enables observation of the peripheral graduated scale 36 on the rotor 32. The lens 46 may be secured in place in any suitable manner such as a suitable adhesive bonding agent or the like. Also, the outer edge of the enlarged portion 42 of the open end 40 may be outwardly beveled as at 48 to facilitate easier reading of the graduated scale 36, eliminate rough edges and also facilitate cleaning of the lens 46.

The outer end portions of the transverse opening 30 are slightly enlarged as indicated by numeral 50 thus defining shoulders 52 abuttingly receiving circular disk-like transparent lenses 54 and 56 therein. With the lenses 54 and 56 engaging the shoulders 52, they will be spaced from the rotor 32 and disposed in parallel relation to the side surfaces thereof. A retaining ring 58 is provided against the outer surface of each of the lenses 54 and 56 for retaining the lenses in place. The rings 58 may be of any suitable construction and may be either press fitted into position or bonded into position for securely retaining the lenses in place. For rotatably supporting the rotor 32, there is provided a transverse axle or shaft 60 received in a central opening 62 in the rotor 32. The shaft 60 extends into sockets 64 formed in the inner surface of the lenses 54 and 56 and bearing sleeves 66 rotatably journal the ends of the shaft 60 in the sockets 64. The inner ends of the bearing sleeves 66 are outwardly deformed to form generally a grommet-like structure 68. Since the bearing sleeve 66 is pressed into the socket 64 in the lens 54, the head or grommet ring 68 serves a twofold purpose, namely, to prevent the bearing sleeve from bottoming in the socket and forming a cone which could lock the shaft and provide a space outside the socket for the application of a bonding agent to further secure the bearing sleeve in place. The depth of the socket 64 in each lens 54 and 56 is of a depth to provide for lateral movement of the rotor shaft without permitting the rotor to come in contact with the grommet ring 68. The rotor 32 is counterbalanced for gravity operation by a cylindrical weight 33 received in an offset opening in the rotor thereby concentrating the weight in the peripheral portion of the rotor which peripheral portion will normally be at the lowermost point.

The lens 42 is provided with an index hairline 70 which aligns with the zero degree line when the level frame is in true horizontal position. Also each of the lenses 54 56 has an index hairline 72 for alignment with the zero degree marking on the graduated scales 34 when the frame is in horizontal position. Any deviation from a horizontal position will be immediately indicated by the rotor since the counterbalanced rotor will remain in a fixed position relative to the true horizontal plane during angular movement of the frame about an axis generally transverse to the longitudinal axis of the frame.

As illustrated in FIGURE 4, the spirit level vial assembly is designated by numeral 74 which includes a housing 76 preferably of cylindrical metal or stock shaft having a partial spherical recess 78 in each end thereof and having a longitudinal cavity 80 in which the spirit bubble vial 82 is mounted. The spirit bubble vial is securely mounted in the cavity 80 by any suitable means such as bonding or the like and a pair of serrated or knurled thimble rings 84 encompass the ends of the housing 76 and the corresponding vial 82 thus further securely mounting the spirit bubble vial in the housing 76. As illustrated, two spirit level vials are disposed in the frame with one of the vials being disposed on the center line and parallel to the top and bottom surfaces and the other vial being disposed transverse of the level and provided with an axis parallel to the end surfaces and normal to the top and bottom surfaces of the frame.

The spirit level vial assembly 74 is held in place accurately and securely by means of two threaded screws 86 screw-threaded into corresponding openings 88 which are internally threaded in both the top and bottom surfaces of the frame as illustrated in FIGURE 2 or in the partitions 28 in the case of the spirit level vial parallel to the top and bottom surfaces. Each of the screws 86 is provided with a transverse kerf or slot 90 for receiving a screwdriver or other suitable instrument for adjustment purposes and the inner end of each of the screws 86 is provided with a semi-spherical recess 92 providing a bearing surface for a spherical shaft 94 which also is partially received in the seat 78 thereby rotatably journalling the housing 76 and the entire bubble level assembly 74 about the longitudinal axis of the assembly for rotation manually to any desired angular position about the longitudinal axis of the spirit level assembly. This construction enables the spirit bubble vial assemblies to be manually rotated a full 360 degrees and may be rotated to any predetermined angle of inclination and frictionally locked in place by tightening the spirit bubble mounting screws 86. This feature provides means for quickly determining uniformity in the angle of inclination relative to the horizontal plane of a series of widely separated objects such as structural steel members, roof rafters and the like thereby eliminating human error and repetitious work in rechecking such objects. Also, the level frame may be transversely rotated ninety degrees to either side and the spirit bubble level is then manually rotated bringing the arc of the vial to a vertical position. Then the coaction of the spirit bubble vials provide the means of determining the degree of levelness in two directions simultaneously. This feature eliminates the requirement of two levels or the necessity of having to turn the level from one direction to another.

The spherical shafts function to journal the level vial assemblies. This structure provides for uniform wear longitudinally which may be immediately compensated for by adjusting the screws 86. This is not possible with conventional bearing structures. Also, the number of spirit level assemblies may vary but the vials which may rotate provides means for determining the degree of levelness in two directions simultaneously without the necessity of having to turn the level from one direction to another.

The rotor and the manner of observation thereof enables the level to be rotated 180 degrees longitudinally or transversely thus providing means for observing the angle of inclination vertically of overhead objects without getting into an unsafe and uncomfortable position to observe the sides of the rotor. Recessing of the lenses 54 and 56 eliminates physical damage thereto as well as the rotor 32. The lenses also hermetically seal the rotor thereby preventing fungi or other foreign material from impeding movement of the rotor. The graduated scales are divided into increments of 3 degrees each for providing more precise reading with the scales divided into four quadrants of 90 degrees each. Also, the rotor is impervious to coercive magnetic fields.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A level comprising an elongated frame having parallel flat top and bottom surfaces, and parallel flat end surfaces, said end surfaces being perpendicular to said top and bottom surfaces, said frame including a central body member having a transverse opening therein, a rotor mounted in said opening for rotation about an axis disposed transversely of the frame, a graduated degree scale on each side of the rotor for observation from either side of the frame, a stationary index line associated with each graduated scale, said rotor having a weight incorporated therein for maintaining a constant relationship to a horizontal plane, the top surface of said frame having an opening therein in alignment with the periphery of the rotor and provided with a stationary index line, and a graduated degree scale on the periphery of the rotor thereby enabling the inclination of the frame to be determined from either side or the top of the frame, said frame including a pair of spaced longitudinal members, and a pair of spaced vertical partitions, a spirit level vial assembly disposed between the pair of partitions, a spirit level vial assembly disposed between the spaced longitudinal members, each assembly including a housing and a bubble vial mounted therein, and means mounting each housing for angular adjustment about the longitudinal axis of the assembly, said mounting means including a pair of adjustable screw-threaded members, a partial spherical recess in the inner end of each screw-threaded member and the outer ends of said housing, and a spherical shaft received in aligned recesses for enabling rotation of the assembly and friction locking thereof in adjusted position.

2. A level comprising an elongated frame having parallel flat top and bottom surfaces and parallel flat end surfaces, said end surfaces being perpendicular to said top and bottom surfaces, said frame including a pair of spaced members, a spirit level vial assembly mounted between said members and including a housing receiving a spirit bubble vial, the ends of said housing having outwardly opening recesses therein, screw-threaded means on said members supportingly engaging said recesses to journal said housing for adjustment of the assembly about the longitudinal axis thereof and selectively locking the assembly in adjusted position, said screw-threaded means including a screw-threaded member having a recess therein, and a shaft extending into aligned recesses, said aligned recesses and shaft including cooperating spherical surfaces.

3. A level structure comprising an elongated rigid frame having parallel top and bottom surfaces and parallel end surfaces orientated in perpendicular relation to the top and bottom surfaces, a pair of spirit level vial assemblies mounted on said frame with one assembly being parallel to the top and bottom surfaces and the other assembly being parallel to the end surfaces, each assembly including a housing receiving a spirit bubble vial, each end of said housing having a recess defined therein with the recesses opening longitudinally outwardly, said frame including adjustable means engaging at least one of said recesses for enabling the housing and spirit bubble vial mounted therein to be rotated completely about a longitudinal axis thereby enabling the vials to be rotated a full 360 degrees continuously in the same direction to determine the degree of levelness in two directions simultaneously, each of said recesses being partially spherical in configuration, a spherical ball engaged with each of said recesses, said adjusting means including a screw threading member engaging both of said balls with each screw threaded member having a partially spherical recess therein to enable adjustment for wear and adjustment of frictional resistance to rotation of the housing and spirit level vial mounted therein.

4. A level comprising an elongated frame having a pair of parallel opposed surfaces and including a central body member having a transverse opening therein, a rotor mounted in said opening for rotation about an axis disposed substantially transversely of the frame, a graduated scale on at least one side of the rotor, a stationary index line associated with said scale, said rotor being substantially cylindrical and including a weight incorporated therein for maintaining a constant relationship to a horizontal plane, one of said parallel surfaces on said frame having an opening therein in alignment with the periphery of the rotor and provided with a stationary index line, the periphery of said rotor including a graduated scale thereon for enabling inclination of the frame to be determined from at least two positions in relation to the frame, a spirit level vial assembly mounted in said frame and including a housing and a bubble vial mounted therein, and means mounting the housing for rotation about the longitudinal axis of the assembly, said means comprising a recess in each end of the housing, partial spherical means engaging each recess, and screw threaded means engaging at least one of the partial spherical means to enable variation in frictional resistance to rotation of the housing and to enable wear to be compensated for.

References Cited by the Examiner
UNITED STATES PATENTS

| | | | |
|---|---|---|---|
| 288,624 | 11/83 | Davis | 33—214 |
| 565,098 | 8/96 | Traut | 33—207 |
| 851,717 | 4/07 | Watts | 33—215.1 |
| 1,141,315 | 6/15 | Caughron | 33—215.1 |
| 1,703,006 | 2/29 | Jay | 33—214 |
| 1,992,675 | 2/35 | Potsbury | 33—215.1 |
| 2,102,364 | 12/37 | Langsner | 33—214 |
| 2,342,359 | 2/44 | Mitchell | 33—218 |
| 2,595,109 | 4/52 | Steady | 33—206 |
| 2,993,281 | 7/61 | Dock | 33—211 |

ISAAC LISANN, *Primary Examiner.*